United States Patent
Raghavan et al.

(10) Patent No.: US 11,764,853 B2
(45) Date of Patent: Sep. 19, 2023

(54) MACHINE LEARNING APPROACH TO MITIGATE HAND BLOCKAGE IN MILLIMETER WAVE SYSTEMS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/537,197

(22) Filed: Nov. 29, 2021

(65) Prior Publication Data
US 2023/0170967 A1    Jun. 1, 2023

(51) Int. Cl.
*H04B 7/06* (2006.01)
*H04B 1/3827* (2015.01)

(52) U.S. Cl.
CPC ........ *H04B 7/0695* (2013.01); *H04B 1/3838* (2013.01); *H04B 7/0634* (2013.01); *H04B 7/0639* (2013.01)

(58) Field of Classification Search
CPC .. H04B 7/0695; H04B 1/3838; H04B 7/0634; H04B 7/0639
See application file for complete search history.

(56) References Cited

U.S. PATENT DOCUMENTS

| | | | |
|---|---|---|---|
| 2019/0090143 A1* | 3/2019 | Luo | H04W 16/28 |
| 2019/0150003 A1* | 5/2019 | He | H04B 7/0617 342/368 |
| 2019/0150133 A1* | 5/2019 | Li | H04B 7/0695 375/224 |
| 2019/0238202 A1* | 8/2019 | Chavva | H04B 7/0617 |
| 2019/0253117 A1 | 8/2019 | Raghavan et al. | |
| 2019/0341989 A1* | 11/2019 | Raghavan | H04B 17/327 |
| 2020/0275402 A1* | 8/2020 | Shi | G01S 5/0278 |
| 2021/0242925 A1* | 8/2021 | Bai | H04B 7/088 |
| 2021/0243630 A1* | 8/2021 | Bai | H04L 1/1614 |
| 2022/0039191 A1* | 2/2022 | Raghavan | H04B 7/0695 |

OTHER PUBLICATIONS

International Search Report and Written Opinion—PCT/US2022/077205—ISA/EPO—dated Dec. 8, 2022.

* cited by examiner

*Primary Examiner* — Jaison Joseph
(74) *Attorney, Agent, or Firm* — Arent Fox, LLP

(57) ABSTRACT

The present disclosure provides for beam selection by a mobile device based on a sensor state of the mobile in order to mitigate hand blockage. The mobile device detects, during operation of the mobile device, a sensor state caused by a hand of an operator on the mobile device. The mobile device selects for communication, while operating in the sensor state, a refined beam set corresponding to the sensor state based on reference signals. The mobile device trains a machine learning model based on a set of training data including pairs of the sensor state and the refined beam set to select a first set of beam weights from a second set of beam weights based on a detected sensor state. The mobile device selects for communication a hand blockage state including the first set of beam weights for a current detected sensor state based on the machine learning model.

30 Claims, 12 Drawing Sheets

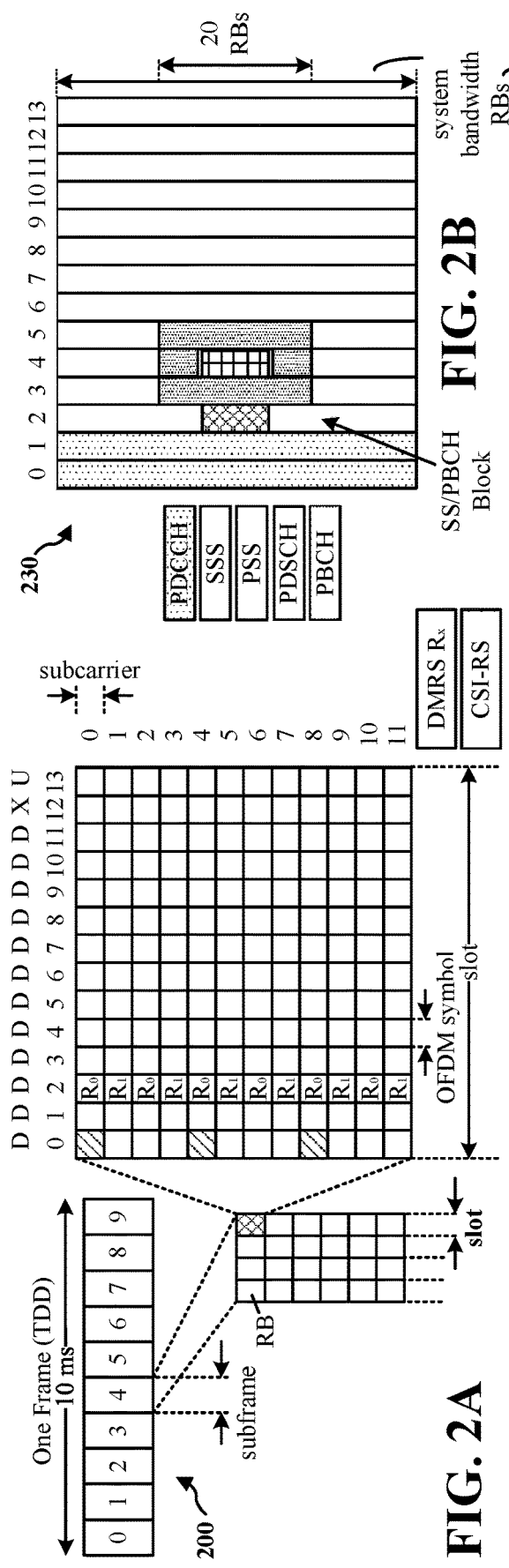
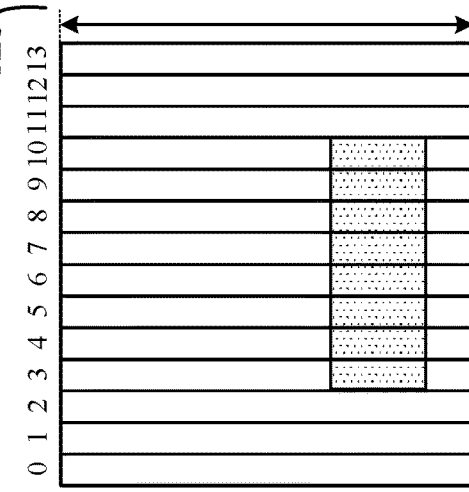
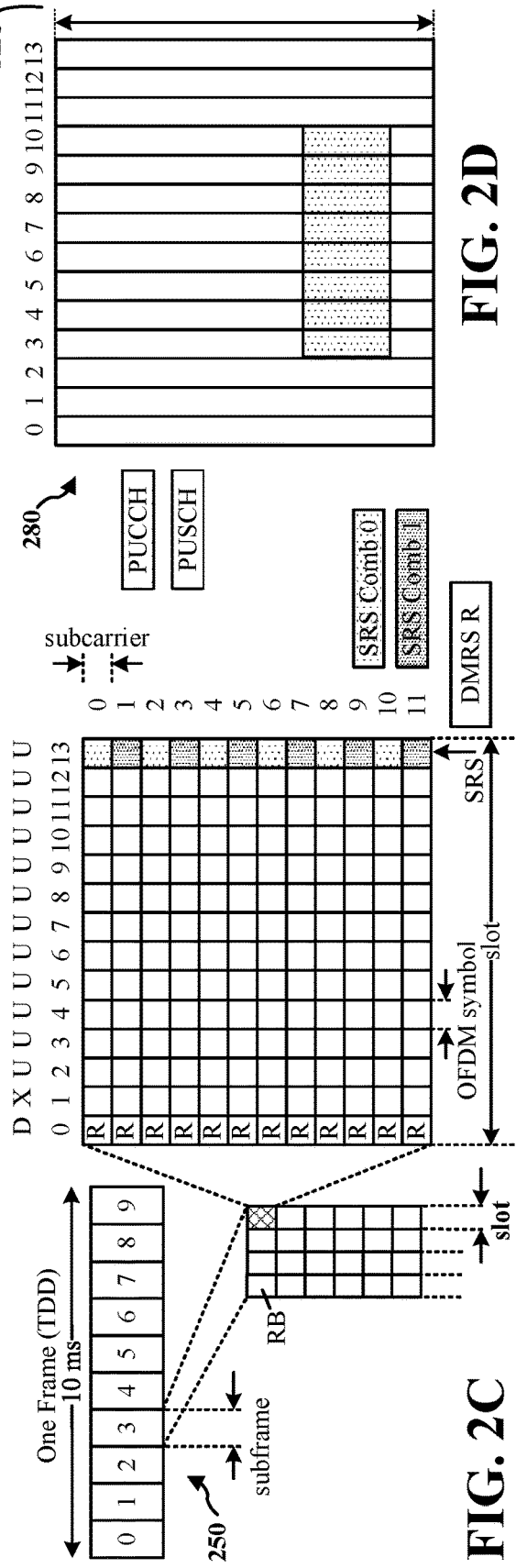
FIG. 2A  FIG. 2B  FIG. 2C  FIG. 2D

MACHINE LEARNING APPROACH TO MITIGATE HAND BLOCKAGE IN MILLIMETER WAVE SYSTEMS

BACKGROUND

Technical Field

The present disclosure relates generally to communication systems, and more particularly, to a machine learning approach to mitigate hand blockage in millimeter wave systems as well as systems operating at sub-Terahertz frequencies.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3 GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of beam selection for wireless communication by a mobile device. The method may include detecting, during operation of the mobile device, a sensor state caused by a hand of an operator on the mobile device. The method may include communicating, while the mobile device is operating in the sensor state, using a refined beam set selected based on reference signals, the refined beam set corresponding to the sensor state. The method may include training a machine learning model based on a set of training data including pairs of the sensor state and the refined beam set to select a first set of beam weights using a second set of beam weights as a basis based on a detected sensor state. The method may include communicating, during operation of the mobile device, using the first set of beam weights based on a hand blockage state including the first set of beam weights for a current detected sensor state selected based on the machine learning model.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of assisting beam training at a mobile device. The method may include transmitting downlink reference signals for beam training at the mobile device. The method may include receiving, from the mobile device, a request to refine a set of beams weights selected by the mobile device based on a sensor state of the mobile device. The method may include transmitting a configuration of reference signals in response to the request. The method may include transmitting or receiving the reference signals according to the configuration.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of DL channels within a subframe, in accordance with certain aspects of the present description.

FIG. 2C is a diagram illustrating an example of a second frame, in accordance with certain aspects of the present description.

FIG. 2D is a diagram illustrating an example of a subframe, in accordance with certain aspects of the present description.

DETAILED DESCRIPTION

Figure 1:
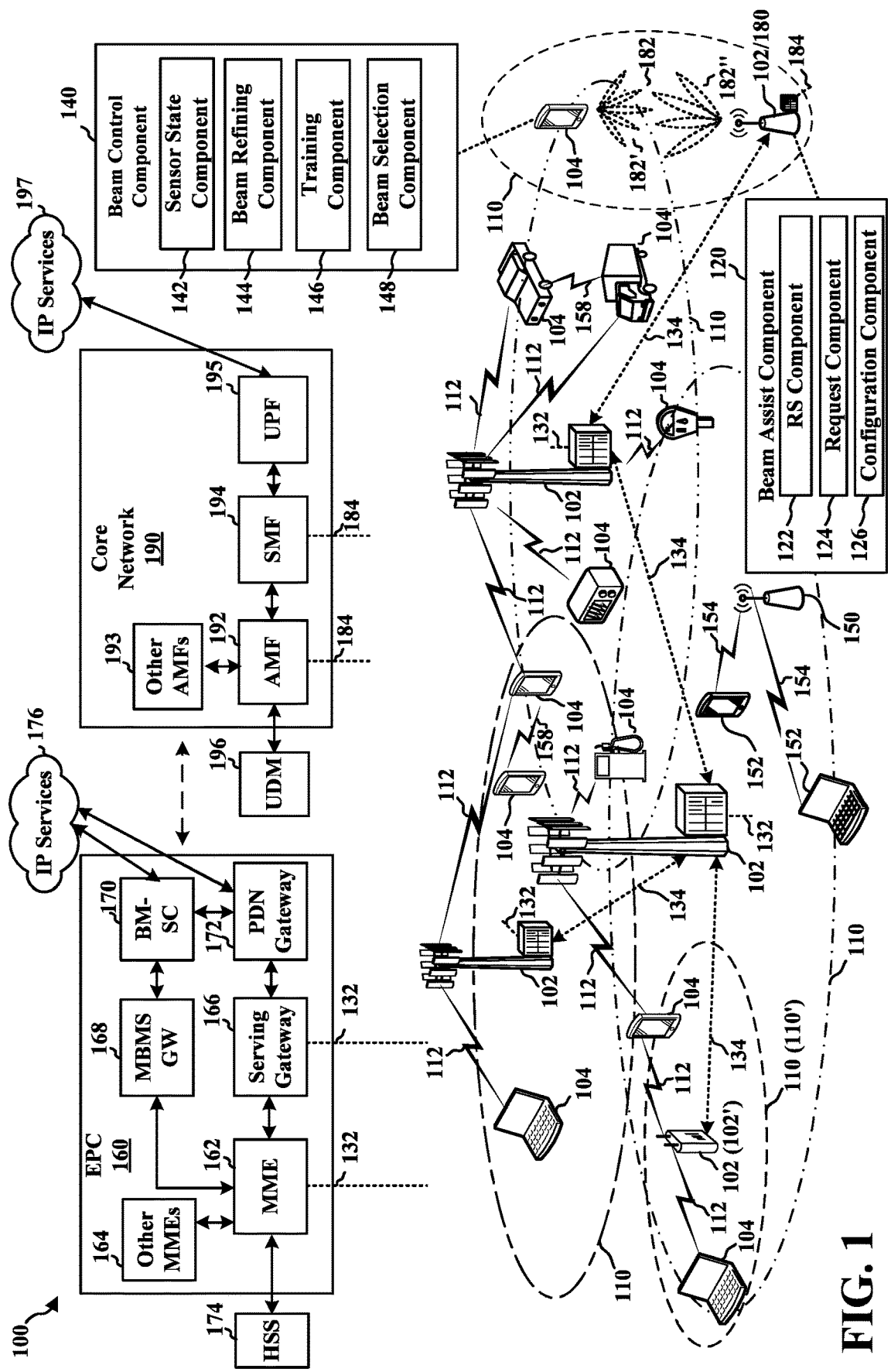
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Multiple antennas may be used in a base station (e.g., a gNB) and a user equipment (UE) in a millimeter wave system. Due to the high expected path loss in a millimeter wave system, beamforming from multiple antennas is expected to bridge the link budget. Conventionally, codebook-based or directional beamforming is assumed at both the base station and the UE. For example, due to memory and complexity constraints, a fixed codebook may be stored in a radio-frequency integrated circuit (RFIC) memory at both the base station and the UE, and beam training may be performed over the fixed codebooks. For example, hierarchical beam training may include selection of different beams from the different hierarchies. For example, 3GPP TS 38.802 v. 14.0 defines P-1, P-2, and P-3 procedures for selection of transmit and receive beams. Beam training based on the use of a codebook may be referred to as a static codebook approach.

Hand blockage may refer to the effect of hand of an operator holding the UE on RF performance of the UE. In particular, hand blockage may have a significant effect (e.g., several dBs) at millimeter wave frequencies and at sub-Terahertz frequencies. Generally, adaptive or dynamic beam weights may be used to handle hand blockage, but may incur significant latency and power usage for beam training in figuring out these adaptive/dynamic beam weights.

In an aspect, the present disclosure provides techniques for a machine learning approach to select beam weights based on a sensor state of the UE. The effect of hand blockage may depend on user specific characteristics such as hand positioning or hand grip, hand size, skin properties, relative position of the fingers to the radiating elements, etc. The machine learning approach may include training a model to classify sensor data to a hand blockage state including a set of beam weights. The UE may collect sensor state data during operation of the UE. The UE may also perform beam training during the operation of the UE to determine a refined beam set. The UE may train a machine learning model based on a set of training data including pairs of the sensor state and refined beam set. In some implementations, the UE may export the set of training data to an external device (e.g., the base station or a network machine learning node) to train the model. The model itself may or may not be made explicit to the mobile device. During operation, the UE and/or the network may select a hand blockage state including a set of beam weights for a current sensor state based on the machine learning model. Accordingly, the UE may reduce latency and/or power consumption (and associated thermal overheads) of beam selection by selecting beam weights based on a local sensor state rather than performing a beam training procedure.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the UEs 104 may include a beam control component 140 configured to determine beam weights based on a sensor state of the UE. The beam control component 140 may include a sensor state component 142 configured to detect, during operation of the mobile device, a sensor state caused by a hand of an operator on the mobile device. The beam control component 140 may include a beam refining component 144 configured to select, while the mobile device is operating in the sensor state, a refined beam set corresponding to the sensor state based on reference signals. The beam control component 140 may include a training component 146 configured to train a machine learning model based on a set of training data including pairs of the sensor state and the refined beam set to select a first set of beam weights from a second set of beam weights based on a detected sensor state. The beam control component 140 may include a beam selection component 148 configured to select, during operation of the mobile device, a hand blockage state including the first set of beam weights for a current detected sensor state based on the machine learning model.

In an aspect, as illustrated, one or more of the base stations 102 may include a beam assist component 120 configured to assist a mobile device to select beam weights. The beam assist component 120 may include a reference signal (RS) component 122 configured to transmit downlink reference signals for beam training at the mobile device. The beam assist component 120 may include a request component 124 configured to receive, from the mobile device, a request to refine a set of beams weights selected by the mobile device based on a sensor state of the mobile device. The beam assist component 120 may include a configuration component 126 configured to transmit a configuration of reference signals in response to the request. The RS component 122 may be further configured to transmit or receive the reference signals according to the configuration.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL).

While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu *15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
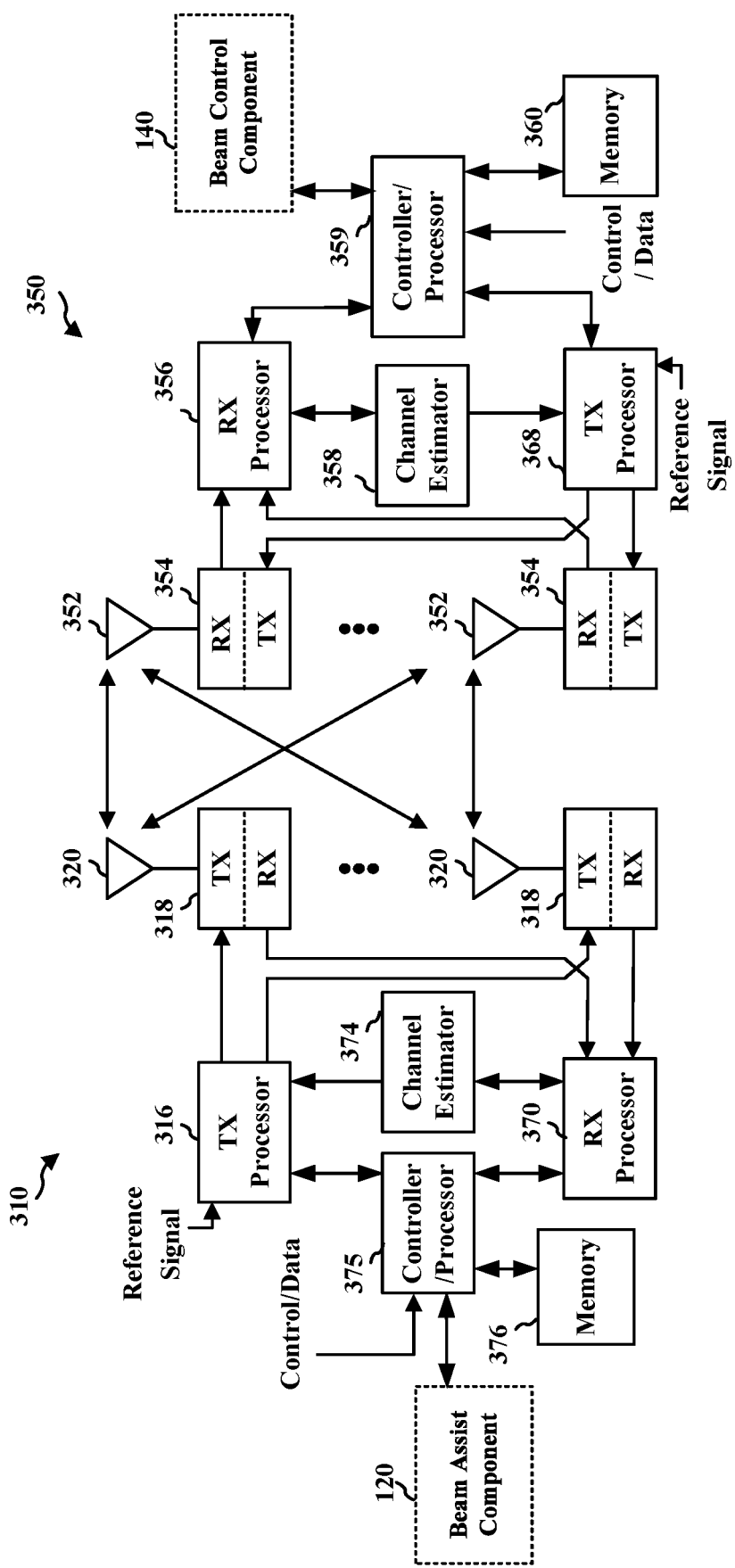
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam control component 140 of FIG. 1.

At least one of the TX processor 316, the RX processor 370, and the controller/processor 375 may be configured to perform aspects in connection with the beam assist component 120 of FIG. 1.

Figure 4:
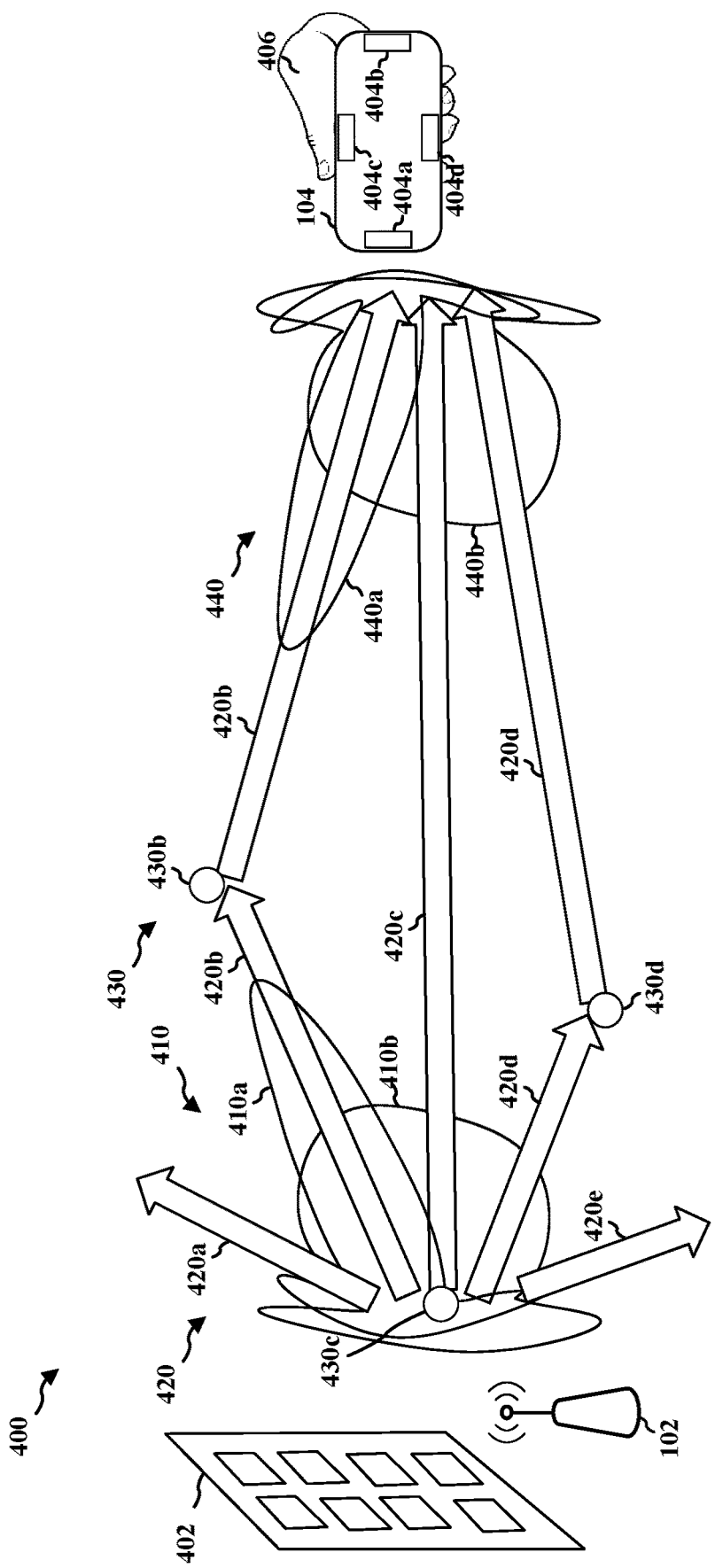
FIG. 4 is a conceptual diagram illustrating examples of beams transmitted from a base station to a UE.

Turning to FIG. 4, a conceptual diagram 400 includes beams 410 transmitted from a base station 102 to a UE 104. The beams 410 may be the result of different antenna configurations at the base station 102, which may typically include a large antenna array 402 for beam steering. For example, the beams 410 may include a first beam 410a that is relatively narrow and a second beam 410b that is relatively wide. The base station 102 may control beam weights to steer the beams 410 in a particular direction. For example, a channel may include multiple paths 420 (e.g., paths 420a-420e) between the base station 102 and the UE 104. For instance, a direct path 420c may exist if there is a line of sight between the base station 102 and the UE 104. An RF signal may also follow an indirect path. For example, the signal may reflect off an object such as a building, vehicle, or window.

From the perspective of the UE 104 including antenna modules 404 (e.g., 404a-404d), the signal may appear to arrive from a certain direction via reflections or diffraction (typically called a cluster 430). A cluster (e.g., clusters 430b-430d) may be a reflected or a diffracted source of a signal that arrives at the UE 104. For example, a cluster 430c may correspond to the base station 102 and the clusters 430b and 430d may correspond to objects that reflect the signals in the indirect paths 420b and 420d, respectively. Other paths such as path 420a and 420e may not reach the UE 104 with sufficient signal strength. The UE 104 may have an active antenna configuration that generates a receive beam 440 (e.g., receive beams 440a and 440b). For example, the receive beam 440a may be generated by a first active antenna configuration and the receive beam 440b may be generated by a second active antenna configuration. The UE 104 may control antenna weights to steer the receive beam 440 towards one or more clusters 430. A strongest cluster may be referred to as a dominant cluster and other clusters may be referred to as sub-dominant clusters.

Further, the position of a hand 406 on the UE 104 may cause hand blockage that affects the receive beams 440. The UE 104 may attempt to mitigate hand blockage by switching antenna module 404 (also referred to as panels) and/or using a better receive beam 440. The switching of antenna module 404 and/or receive beam 440 may be within the same transmission-reception point (TRP) or a different TRP if available. Antenna and/or beam switching may be effective if the channel is sufficiently rich to provide these options. However, antenna and/or beam switching to an unblocked cluster may not always be feasible. For example, beam switching may be possible if beam switching latencies are small relative to time-scales at which data disruption are acceptable or at time-scales at which channel/cluster properties changes. These time-scales depend on UE mobility and use-cases. Further, beam switching comes at an overhead on a control channel, which may not be acceptable in some cases. If beam switching is not available, the UE may continue to operate with deterioration due to hand blockage. The deterioration may be approximately 0-40 dB depending on the angle of the cluster relative to the orientation and properties of the hand. Structures in the fingers of the hand can irregularly reflect energy. Such reflections may be mitigated with appropriate phase shifter and amplitude control adaptations.

The UE 104 may dynamically change an active antenna configuration to focus on one or more clusters and/or to mitigate hand blockage effects. For example, the UE 104 may use the active antenna configuration that generates the receive beam 440a when the cluster 430b is the dominant cluster in the channel between the base station and the UE 104. The UE 104 may change the active antenna configuration to generate the receive beam 440b when there are multiple strong clusters. In the case of a linear antenna array, changing between subsets of the antenna elements may affect the beamwidth of the receive beam 440, but may not have a great impact on the direction of other dimensions of the receive beam 440. When the UE 104 has a larger antenna array with more degrees of freedom, a change in the active antenna configuration may change the receive beam 440 in a different dimension. For example, the beamwidth may expand or contract in the azimuth or elevation dimension. Accordingly, as the degrees of freedom in active antenna configuration selection increase, there is a greater likelihood that the best beam for the base station 102 will also change.

Dynamic beam weights may effectively adapt the phase shifter and amplitude control to address hand related signal impairments. The effect of a hand of an operator on the beams may be difficult to predict due to variation in hand properties among operators. In an aspect, the machine learning approach of the present application learns the dynamic beam weights that are effective for a particular operator during operation. For example, the beam training may include aperiodic or periodic CSI-RS (or SRS) symbols to detect the effect of hand blockage. Determination of beam weights during operation, however, may be onerous in view of a large number of antenna elements, power and thermal considerations, maximum permissible exposure (MPE) constraints, and other factors. Accordingly, the present disclosure utilizes machine learning to map sensor data to beam weights such that the beam weights may be selected based on the sensor data without performing a beam training process based on reference signals.

Figure 5:
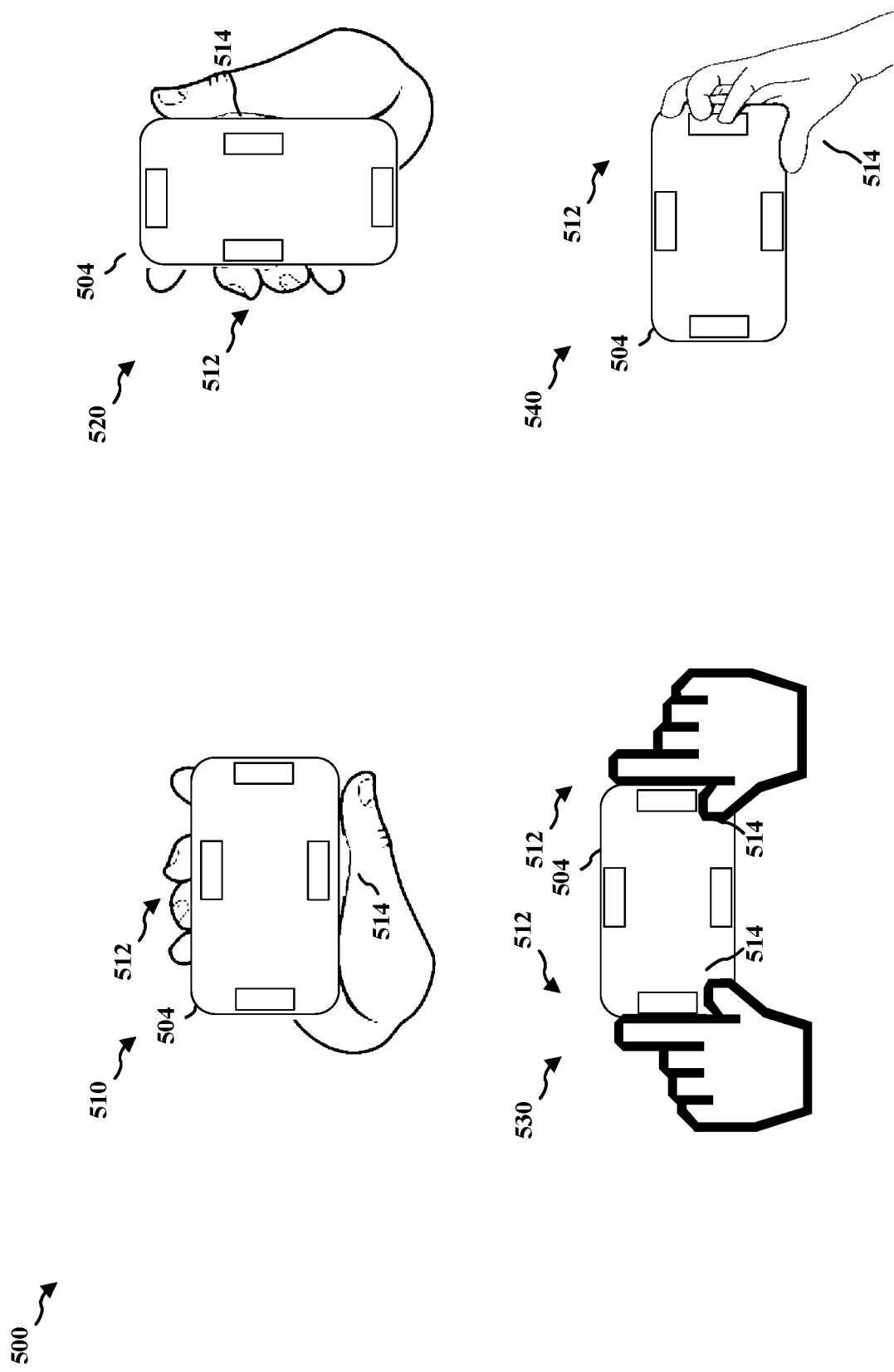
FIG. 5 is a diagram illustrating examples of hand positions for holding a mobile device such as a smartphone.

FIG. 5 is a diagram 500 illustrating various hand positions for holding a mobile device 504 such as a smartphone. The mobile device 504 may be or may include the UE 104. In a first position 510, the operator may hold the mobile device 504 horizontally with one hand. For example, the first position 510 may be used when viewing a video on the mobile device. One or more fingers 512 may cover the antenna module 404d, and the thumb 514 may cover the antenna module 404c.

In a second position 520, the operator may hold the mobile device 504 vertically with one hand. For example, the second position 520 may be used to read text and interact (e.g., scroll) using the thumb 514. One or more fingers 512 may cover the antenna module 404d. A finger of palm of the hand may cover the antenna module 404b.

In a third position 530, the operator may hold the mobile device 504 horizontally with two hands. For example, the third position 530 may be used to play a mobile game. The antenna modules 404a and 404b may be blocked by the fingers or palm of the operator.

In a fourth position 540, the operator may hold the mobile device 504 horizontally from the side with the fingers of one hand. For example, the fourth position 540 may be used for taking a photograph. Because the fingers are located near the corners of the mobile device 504, the antenna modules 404 may not be blocked.

Figure 6:
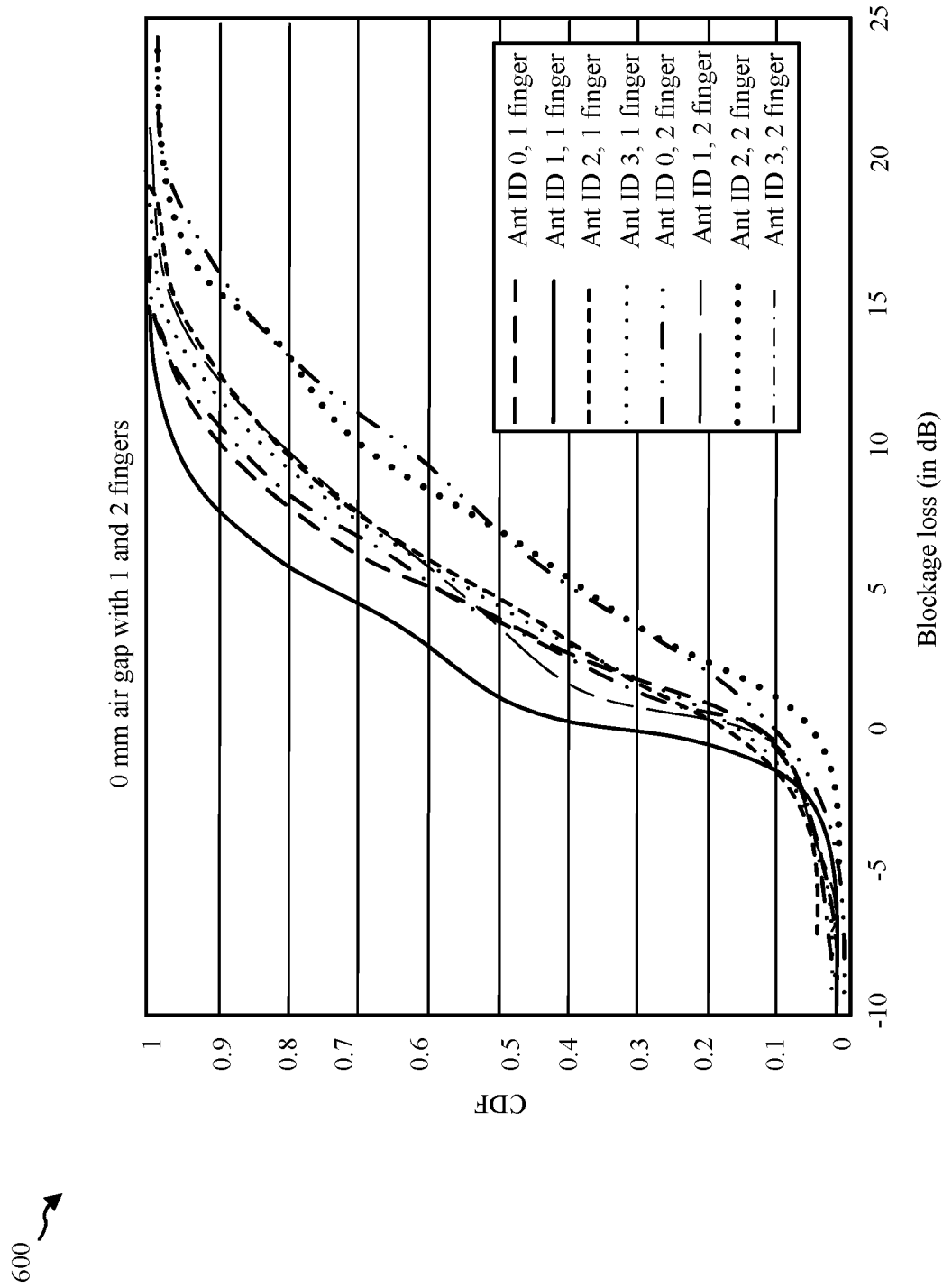
FIG. 6 is a diagram showing an example of blockage loss of different antenna modules with different hand positions.

FIG. 6 is a diagram 600 showing blockage loss of different antenna modules with different hand positions. The hand blockage loss may vary based on position of the hand with respect to antenna modules and clusters. For example, an antenna module may be blocked by one or two fingers with or without an air gap between the fingers. A cumulative distribution function (CDF) illustrates the percentage of scenarios or hand holding positions experiencing the amount of loss described on the abscissa. Median hand blockage loss (e.g., at 50%) may be approximately 3-5 dB for most scenarios or hand holding positions, although the hand blockage loss ranges from 1-8 dB for all scenarios or hand holding positions. The hand blockage loss in signal strength may significantly affect data rates that may be achieved with the lower signal strength.

Figure 7:
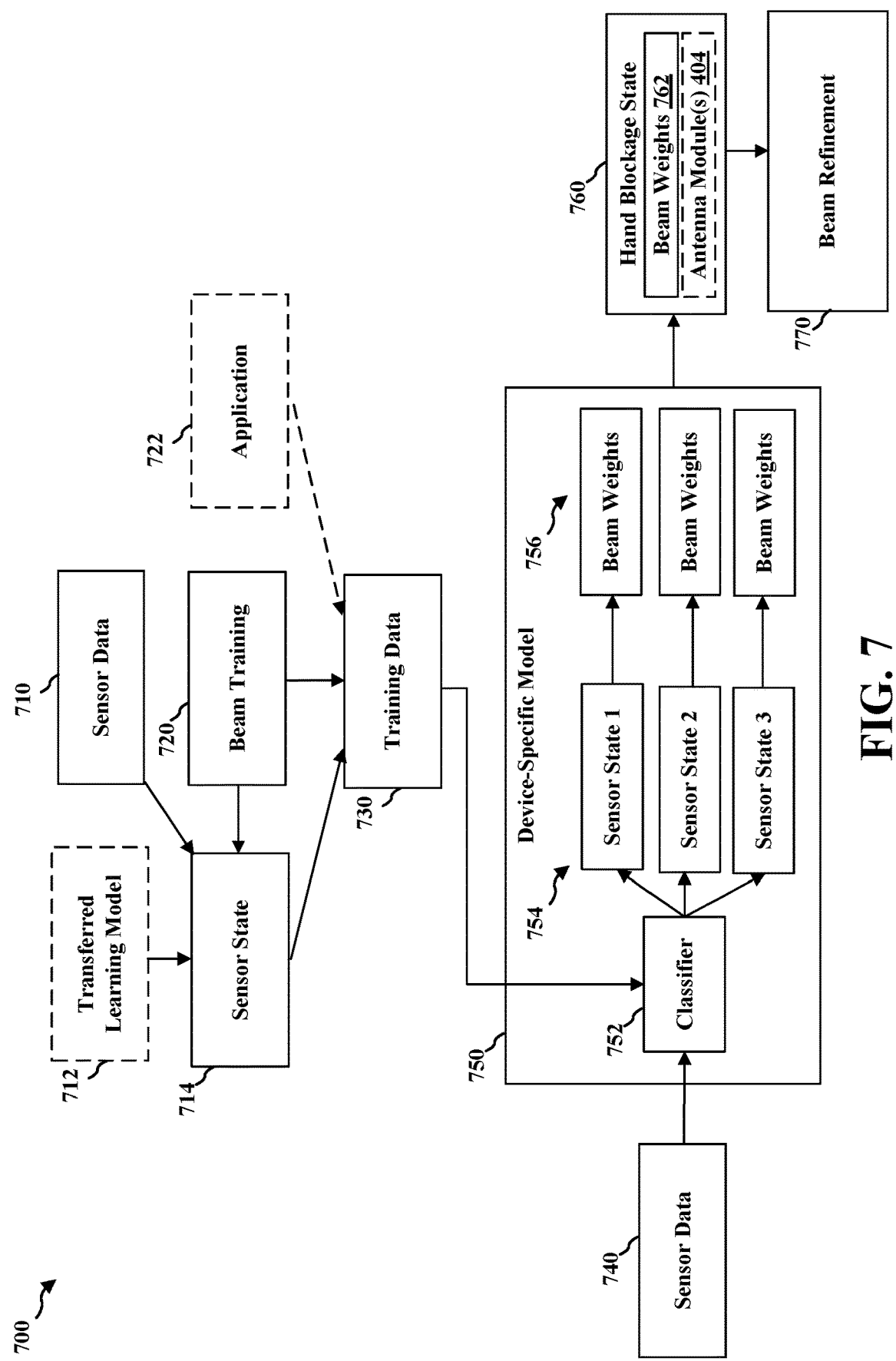
FIG. 7 is a diagram of an example architecture for a machine learning approach to mitigating hand blockage loss.

FIG. 7 is a diagram 700 of an example architecture for a machine learning approach to mitigating hand blockage loss. A UE 104 of a mobile device 504 may use the architecture to select dynamic beam weights to mitigate hand blockage loss. Basically, a UE 104 may develop a device-specific model 750 during operation based on at least sensor data 710 and beam training 720. The device-specific model 750 may be specific for a device and/or an operator of the device. Once the device-specific model 750 is trained, the UE 104 may more efficiently select a hand blockage state 760 and beam weights 762 based on sensor data 740 using the model 750.

The sensor data 710 may include measurements from one or more sensors within the mobile device. For example, the sensor data 710 may include data from one or more of: a gyroscope, a camera, an image sensor, an infra-red (IR) sensor, or a capacitive sensor, a motion sensor, a Doppler detector/sensor, frequency-modulated continuous-wave (FMCW) radar, a LIDAR system, etc. Any other sensing or inferencing mechanism that monitors the presence of hand/fingers on/near the antenna elements/modules is not discounted.

In some implementations, the UE 104 may be configured with a transferred learning model 712. The transferred learning model 712 may be a machine-learning model for classifying sensor data. For example, the transferred learning model 712 may be specific for a model of the mobile device 504. The transferred learning model 712 may be pre-configured within the mobile device 504 or may be provided via an over-the-air update. For example, the transferred learning model 712 may be trained based on laboratory tests to classify sensor data 710 into a hand position such as hand positions 510, 520, 530, 540. In some implementations, the hand positions may correspond to one or more of a hand grip, an orientation of the hand with respect to an antenna module, a number of fingers covering the antenna module, or properties of the hand. As another example, the transferred learning model 712 may be derived from device-specific models shared to a central entity (e.g., a network operator or device manufacturer or a centralized node specialized for machine learning applications in the network).

Beam training 720 may include codebook and/or dynamic beam training procedures for determining a set of beam weights. Generally, dynamic beam training based on aperiodic or periodic CSI-RS (or SRS) symbols may better mitigate hand blockage loss. That is, the beam training 720 may include processing CSI-RS (or SRS) symbols to determine effective dynamic beam weights.

The beam training 720 may be associated with a sensor state 714. For example, the associated sensor state 714 may be the current sensor data 710 when the beam training 720 is complete, or an average of the sensor data 710 during the beam training 720. In some implementations, the sensor state 714 may be associated with the beam training 720 when the sensor state 714 remains stable during the beam training 720. Where a transferred learning model 712 is available, the sensor state 714 may include a detected hand position.

The UE 104 may collect a set of training data 730 based on at least the sensor state 714 and the beam training 720. The sensor state 714 and the associated beam weights from the beam training 720 may form a data point in training data 730. The UE 104 may continually collect data points during operation. In some implementations, the training data 730 may further include an application 722 associated with each data point. The application 722 may be a software application executed on the mobile device 504 at the time of each data point. The application 722 may provide further information about hand position. That is, the operator is likely to hold the mobile device 504 in a similar manner each time the operator uses an application.

The UE 104 may train the device-specific model 750 based on the training data 730. The UE 104 may include a neural processing engine (NPE) that trains the device-specific model 750 as a neural network. In some implementations, for example, the device-specific model 750 includes a classifier 752 that is trained to classify sensor data 740 into one of a finite number of sensor states 754. The sensor states 754 may correspond to sensor states of the transferred learning model 712 or other groupings of the sensor state 714. For instance, if no transferred learning model 712 is available to define sensor states, the device-specific model 750 may utilize unsupervised learning techniques (e.g., clustering) to determine the sensor states 754. The device-specific model 750 may be trained to map sensor states 754 to beam weights 756. The device-specific model 750 may include additional layers that factor in other inputs such as channel estimates, power/thermal considerations, and MPE constraints to determine the beam weights 756. In some implementations, the device-specific model 750 includes a data structure such as a database table that maps the current sensor state to the first set of beam weights. A second set of beam weights may include all beam weights stored in the data structure.

The UE 104 may apply the device-specific model 750 to sensor data 740. The sensor data 740 may include the same types of sensor data as the sensor data 710. The device-specific model 750 may output a hand blockage state 760 including selected beam weights 762 for the sensor data 740. The selected beam weights 762 may be applied to the antenna modules 404 to generate the receive beam 440. Accordingly, the device-specific model 750 may allow beam selection to mitigate hand blockage loss based on sensor data 740 without performing beam training 720.

In some implementations, the UE 104 may perform beam refinement 770 on the beam weights 762. The beam refinement 770 may be assisted by the base station. For example, the UE 104 may request a CSI-RS and provide port information such as a number of ports or a number of CSI-RS resources including a number of repetitions or a number of CSI-RS resource sets. The selection of CSI-RS ports and/or CSI-RS resources may allow the UE 104 to test different dynamic beam weights with key performance indicators (KPIs) such as reference signal received power (RSRP), spectral efficiency (Speff), rank, etc. As another example, the UE request for CSI-RS may indicate a specific subset of serving beams. For example, the subset may include beam weights that are not suffering from hand blockage loss. Note that in some implementations, the UE 104 may request to transmit a sounding reference signal (SRS). The request may include a number of ports for SRS and number of SRS transmissions. The base station may identify the best SRS index to the UE, and the UE may use the identified SRS index for uplink dynamic beam weight selection.

Figure 8:
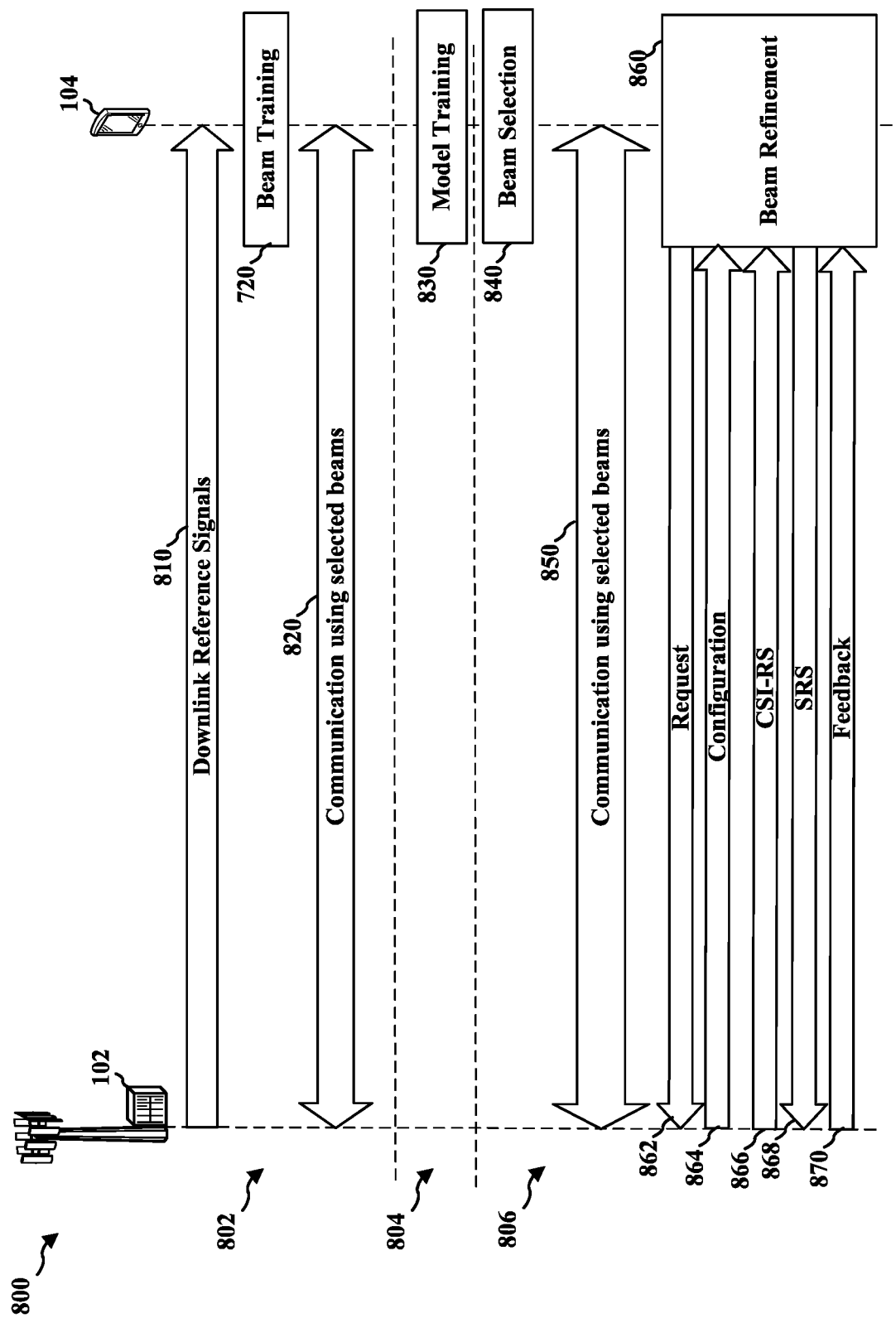
FIG. 8 is a diagram illustrating example communications of a base station and a UE.

FIG. 8 is a diagram 800 illustrating example communications of a base station 102 and a UE 104. The UE 104 may include the beam control component 140. The base station 102 may include the beam assist component 120.

During a conventional operation mode 802, the base station 102 may transmit downlink reference signals 810, which may include, for example, synchronization signal blocks (SSBs) and/or CSI-RS. The UE 104 may perform beam training 720 based on the downlink reference signals 810 to select beam weights. As discussed above regarding FIG. 7, the selected beams and the associated sensor state may be saved as training data. The base station 102 and the UE 104 may transmit communications 820 (e.g., PDCCH, PDSCH, PUCCH, or PUSCH) using selected beam weights.

During an offline operation 804, the UE 104 may perform model training 830 to generate the device-specific model 750. The offline operation 804 may utilize a neural processing engine of the UE 104, for example, when the engine would otherwise be idle or would be used limitedly for other applications.

During a trained operation mode 806, the UE 104 may perform beam selection 840 based on sensor data 740 using the device-specific model 750. For example, the device-specific model 750 may output the hand blockage state 760 including beam weights 762. In some implementations, the device-specific model 750 may identify one or more antenna modules 404 to use or not use. The base station 102 and the UE 104 may transmit communications 850 (e.g., PDCCH, PDSCH, PUCCH, or PUSCH) using the selected beams.

In some implementations, the UE 104 may perform beam refinement 860. For example, the UE 104 may transmit a request 862 for reference signals to assist with the beam refinement 860. The base station 102 may transmit CSI-RS 864 and/or the UE 104 may transmit SRS 866. The base station 102 may provide feedback 868 regarding the index of the best SRS 866.

Figure 9:
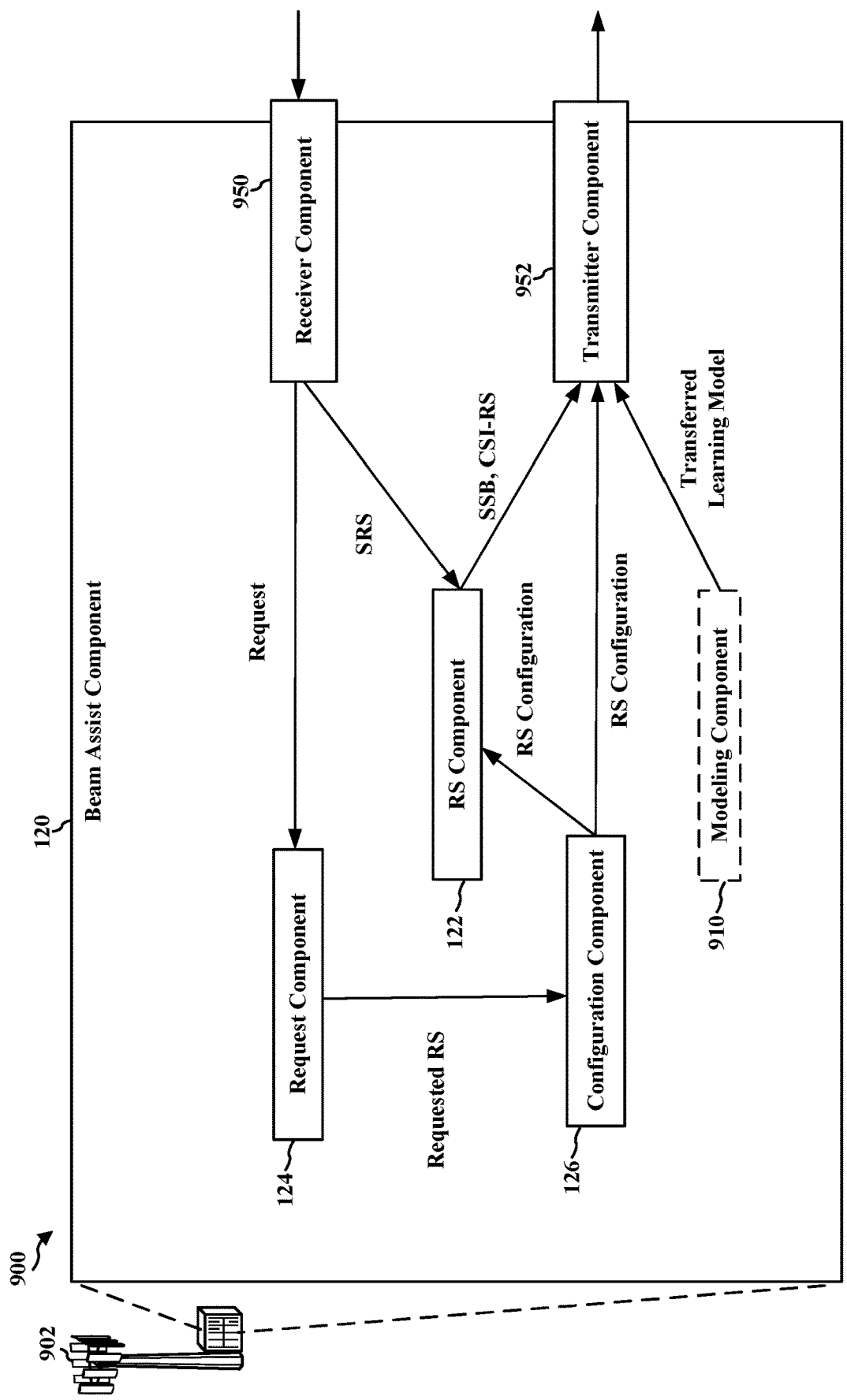
FIG. 9 is a conceptual data flow diagram illustrating the data flow between different means/components in an example base station.

FIG. 9 is a conceptual data flow diagram 900 illustrating the data flow between different means/components in an example base station 902, which may be an example of a UE base station 102 including the beam assist component 120.

The base station 902 may include a receiver component 950, which may include, for example, a radio frequency (RF) receiver for receiving the signals described herein. The base station 902 may include a transmitter component 952, which may include, for example, an RF transmitter for transmitting the signals described herein. In an aspect, the receiver component 950 and the transmitter component 952 may be co-located in a transceiver such as illustrated by the TX/RX 318 in FIG. 3.

As discussed with respect to FIG. 1, the beam assist component 120 may include the RS component 122, the request component 124, and the configuration component 126. In some implementations, the beam assist component 120 may optionally include a modeling component 910.

The receiver component 950 may receive uplink signals such as communication 820, communication 850, request 862, or SRS 866. The receiver component 950 may pass the communications 820, 850 to a decoder (not shown). The receiver component 950 may pass the request 862 to the request component 124. The receiver component 950 may pass the SRS 866 to the RS component 122.

The RS component 122 may be configured to transmit or receive reference signals. For example, the RS component 122 may broadcast SSBs. The RS component 122 may sweep the SSBs across different beams such that a UE 104 may identify an initial beam based on the SSB. The RS component 122 may transmit the CSI-RS. A UE 104 may be configured with various CSI-RS resources and may perform measurements for channel estimation and beam refinement based on the CSI-RS.

The request component 124 may receive the request 862 from a mobile device 504 or UE 104 via the receiver component 950. The request 862 may be a request to refine a set of beams weights selected by the mobile device 504 based on a sensor state of the mobile device. The request 862 may be, for example, an RRC message defined for such requests. In some implementations, the request to refine the set of beams weights includes a number and type of CSI-RS or SRS. In some implementations, the request to refine the set of beams weights includes a request to transmit downlink reference signals on a set of beams for hierarchical beam refinement. In some implementations, the request to refine the set of beams weights includes a request to transmit known symbols for performing hierarchical beam refinement. The request component 124 may determine a set of requested RS from the request 862. The request component 124 may provide the set of requested RS to the configuration component 126.

The configuration component 126 may receive the set of requested RS from the request component 124. The configuration component 126 may determine a RS configuration that satisfies the request 862. For example, the RS configuration may be an aperiodic CSI-RS configuration that includes CSI-RS on requested beams and requested resources. As another example, the RS configuration may be an SRS configuration that identifies resources on which the UE 104 is to transmit SRS. In some implementations, the RS configuration may be for known symbols that can be used as pilot signals for performing hierarchical beam refinement. The configuration component 126 may provide the RS configuration to the RS component 122 to configure the base station 902 to transmit or receive the RS and provide the RS configuration to the transmitter component 952 for transmission to the UE 104.

In some implementations, the beam assist component 120 may include a modeling component 910 that is configured to transmit a configuration of a transferred learning model 712 defining a set of sensor states. The transferred learning model 712 may be generated by the modeling component 910 or received from an external source such as a machine learning node or device manufacturer. For instance, the modeling component 910, machine learning node, or device manufacturer may collect training data from a plurality of UEs. The training data may include sensor data and an associated sensor state or beam set. The modeling component 910, machine learning node, or device manufacturer may train a machine learning model to classify sensor data into a sensor state, which may be mapped to a beam set. Generally, the relationship between sensor data and sensor state may be fairly consistent across the same model of a mobile device. That is, the same model of mobile device is likely to produce similar patterns of sensor data for multiple operators. Accordingly, a model that can classify the sensor data into a finite set of sensor states may provide a starting point for further training to map the sensor states to beam weights that are specific for an operator of a particular device. The modeling component 910 may provide the transferred learning model 712 to a UE 104 via the transmitter component 952.

Figure 10:
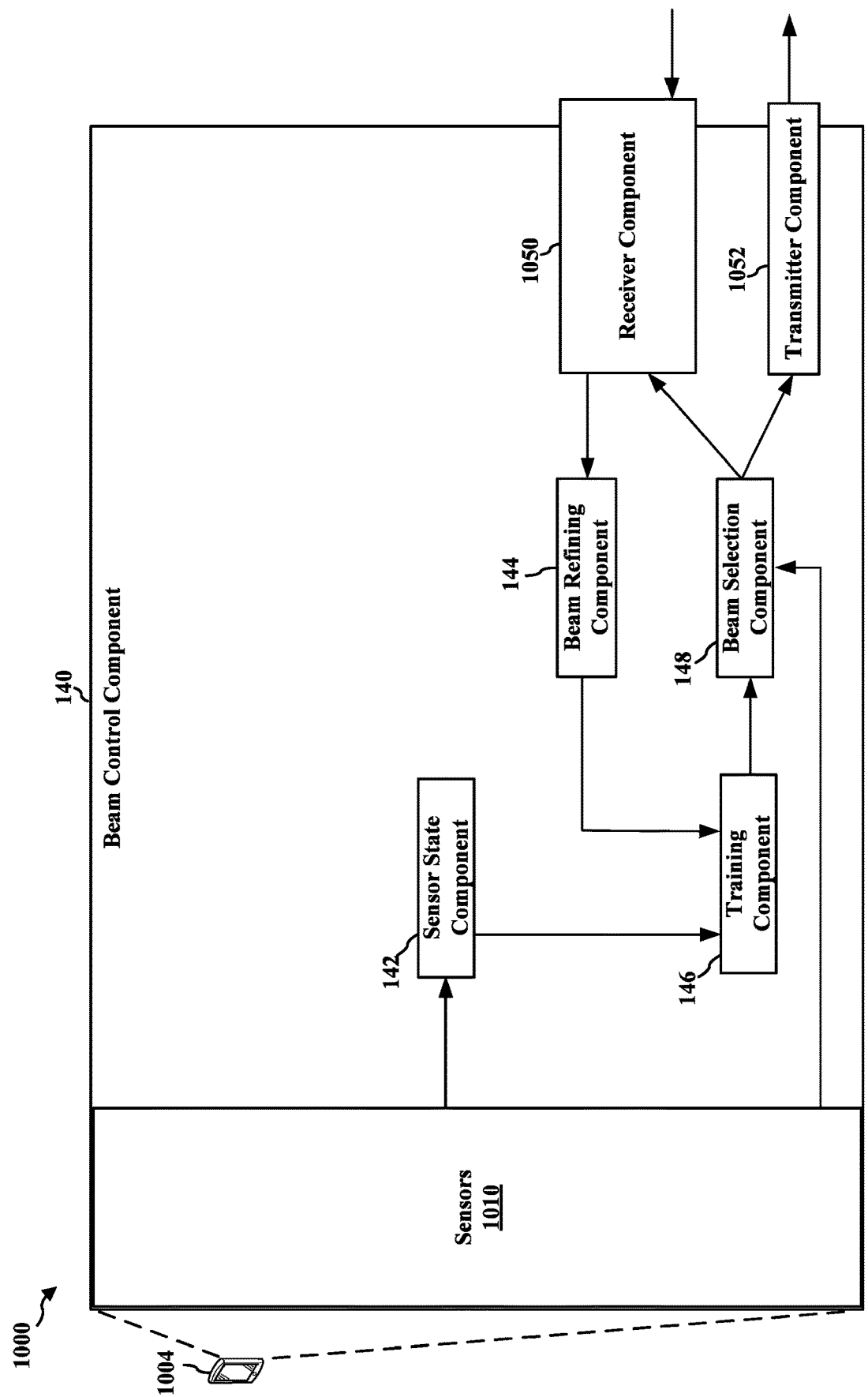
FIG. 10 is a conceptual data flow diagram illustrating the data flow between different means/components in an example mobile device.

FIG. 10 is a conceptual data flow diagram 1000 illustrating the data flow between different means/components in an example mobile device 1004, which may be an example of the mobile device 504. The mobile device 1004 may be or may include an example of the UE 104 including the beam control component 140. In some implementations, for example, the beam control component 140 may be implemented as a modem chipset. The mobile device 1004 may include sensors 1010, which may be located onboard the modem chipset and/or external to the modem chipset. For instance, the sensors 1010 may include one or more of a gyroscope (e.g., an IMU), an image sensor (e.g., a camera), an infra-red sensor, a capacitive sensor, a motion sensor, a Doppler sensor, an FMCW radar, or a LIDAR system. The sensors 1010 may provide sensor data to the beam control component 140 and/or the sensor state component 142.

The mobile device 1004 may include a receiver component 1050, which may include, for example, a RF receiver for receiving the signals described herein. The mobile device 1004 may include a transmitter component 1052, which may include, for example, an RF transmitter for transmitting the signals described herein. In an aspect, the receiver component 1050 and the transmitter component 1052 may co-located in a transceiver such as the TX/RX 352 in FIG. 3.

As discussed with respect to FIG. 1, the beam control component 140 may include the sensor state component 142, the beam refining component 144, the training component 146, and the beam selection component 148.

The receiver component 1050 may receive downlink signals such as the downlink reference signals 810, the communication 820, the communication 850, the configuration 864, the CSI-RS 866, and the feedback 870. The receiver component 1050 may pass the downlink reference signals 810, configuration 864, CSI-RS 866, and feedback 870 to the beam refining component 144. The receiver component 1050 may pass the communications 820 and 850 to a decoder (not shown).

The sensor state component 142 may be configured to detect, during operation of the mobile device, a sensor state caused by a hand of an operator on the mobile device. For example, the sensor state component 142 may receive sensor data from the sensors 1010. In implementations where the sensor state component 142 is configured with a transferred learning model 712, the sensor state component 142 may classify the received sensor data into a defined sensor state. In other implementations, the sensor state may be a combination of sensor data at a given point in time or over a window of time. The sensor state component 142 may provide the sensor state to the training component 146.

The beam refining component 144 may be configured to communicate, while the mobile device is operating in the sensor state, using a refined beam set selected based on reference signals, the refined beam set corresponding to the sensor state. For example, the beam refining component 144 may select, while the mobile device is operating in the sensor state, a refined beam set corresponding to the sensor state based on reference signals (e.g., downlink reference signals 810). For example, the beam refining component 144 may perform hierarchical beam refinement based on a codebook of hierarchical beams, or perform dynamic beam refinement based on a CSI-RS. In any case, the beam refining component 144 may determine a set of beams corresponding to the sensor state at the time the set of beams is selected based on beam refinement. In some implementations, the beam refining component 144 may provide a signal to the sensor state component 142 indicating that the refined beam set has been selected so that the sensor state component 142 detects a current sensor state. The beam refining component 144 may provide the refined beam set to the training component 146. The beam refining component 144 may communicate (e.g., transmit and/or receive communications 820) via receiver component 1050 and/or transmitter component 1052.

In some implementations, the beam refining component 144 may refine a set of beam weights selected based on a sensor state of the mobile device 1004. For example, the beam refining component 144 may receive a first set of beam weights 762 from the beam selection component 148. The beam refining component 144 may request a number and type of CSI-RS 866 or SRS 868 based on the current detected sensor state. For example, the beam refining component 144 may transmit the request 862. For receive beams, the beam refining component 144 may apply different beam weights for receiving the CSI-RS to determine a refined beam. For transmit beams, the beam refining component 144 may transmit SRS 868 with different beam weights. The beam refining component 144 may receive feedback 870 indicating an index of a best transmit beam for the base station 102. In some implementations, the beam refining component 144 may be configured to request a set of beams for hierarchical beam refinement. For example, the beam refining component 144 may determine a subset of beams corresponding to a first set of beam weights. In another implementation, the beam refining component 144 may be configured to perform hierarchical beam refinement based on known symbols transmitted by the base station 102. The beam refining component 144 may provide the refined beam weights back to the beam selection component 148 for use.

The training component 146 may be configured to train a machine learning model based on a set of training data including pairs of the sensor state and the refined beam set to select a first set of beam weights from a second set of beam weights based on a detected sensor state. The training component 146 may receive the sensor state from the sensor state component 142 and receive the refined beam set from the beam refining component 144. The training component 146 may store pairs of the sensor state and the refined beam set that are generated at the particular mobile device 1004. Accordingly, the set of training data may be specific for the mobile device 1004 and/or an operator of the mobile device 1004. Further, the training component 146 may save additional pairs of the sensor state and the refined beam set until a threshold amount of training data is available. The training component 146 may train the device specific model 750 based on the set of training data. For example, the device-specific model 750 may be a neural network and the training component 146 may select weights for the neural network that map the sensor data for the sensor states to the refined beam sets. The training component 146 may provide the trained device-specific model 750 to the beam selection component 148.

The beam selection component 148 may be configured to communicate, during operation of the mobile device, using the first set of beam weights based on a hand blockage state including the first set of beam weights for a current detected sensor state selected based on the machine learning model. For example, the beam selection component 148 may select, during operation of the mobile device 504, a hand blockage state 760 including the first set of beam weights 762 for a current detected sensor state based on the machine learning model. The beam selection component 148 may receive current sensor data from the sensors 1010. The beam selection component 148 may apply the current sensor data to the trained device-specific model 750 to determine the hand blockage state 760 and the beam weights 762. For example, the classifier 752 may determine a sensor state 754 based on the sensor data 740. The beam selection component 148 may retrieve a first set of beam weights 762 from a stored data structure including a second set of beam weights 756. In some implementations, the beam selection component 148 may also indicate one or more antenna modules 404 to which the first set of beam weights 762 are to be applied. The beam selection component 148 may provide the first set of beam weights 762 to the receiver component 1050 and/or the transmitter component 1052 to configure the antenna module 404 with the beam weights. In some implementations, the beam selection component 148 may provide the first set of beam weights 762 to the beam refining component 144 for further refining. The beam refining component 144 may communicate (e.g., transmit and/or receive communications 850) via receiver component 1050 and/or transmitter component 1052.

Figure 11:
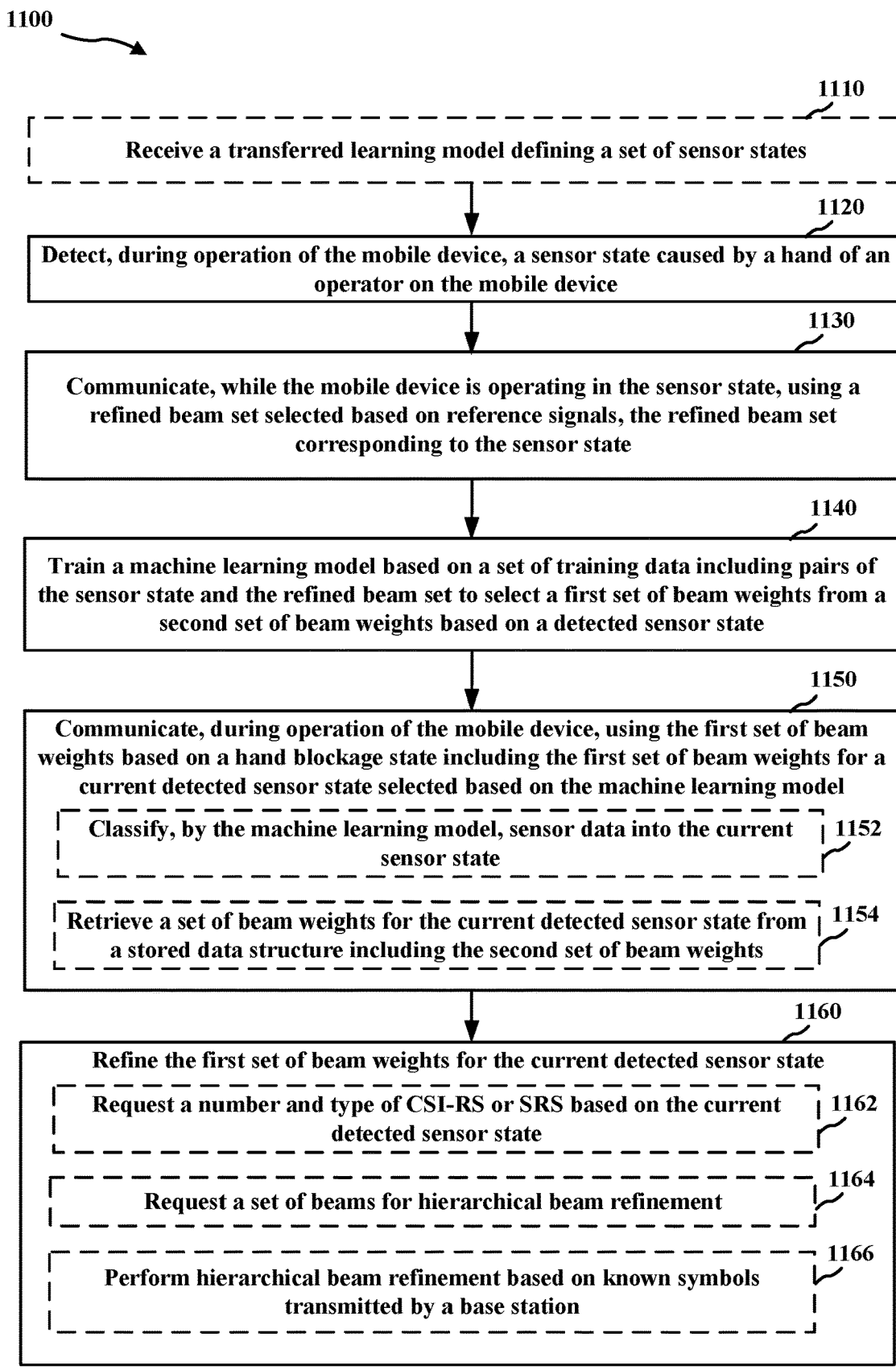
FIG. 11 is a flowchart of an example method for beam selection for wireless communication by a mobile device.

FIG. 11 is a flowchart of an example method 1100 for beam selection for wireless communication by a mobile device. The method 1100 may be performed by a UE (such as the UE 104, which may include the memory 360 and which may be the entire UE 104 or a component of the UE 104 such as the beam control component 140, TX processor 368, the RX processor 356, or the controller/processor 359). The method 1100 may be performed by the beam control component 140 in communication with the beam assist component 120 of the base station 102. Optional blocks are shown with dashed lines.

At block 1110, the method 1100 may optionally include receiving a transferred learning model defining a set of sensor states. In an aspect, for example, the UE 104, the RX processor 356 and/or the controller/processor 359 may execute the beam control component 140 and/or the sensor state component 142 to receive the transferred learning model 712 defining the set of sensor states 714. In some implementations, the transferred learning model 712 is specific for a model of the mobile device 504. Accordingly, the UE 104, the RX processor 356, and/or the controller/processor 359 executing the beam control component 140 and/or the sensor state component 142 may provide means for receiving a transferred learning model defining a set of sensor states.

At block 1120, the method 1100 may include detecting, during operation of the mobile device, a sensor state caused by a hand of an operator on the mobile device. In an aspect, for example, the UE 104, the RX processor 356 and/or the controller/processor 359 may execute the beam control component 140 and/or the sensor state component 142 to detect, during operation of the mobile device 504, a sensor state 714 caused by a hand of an operator on the mobile device. The sensor state 714 may be based on sensor data including data from one or more of: a gyroscope, an image sensor, an infra-red sensor, a capacitive sensor, or a radar sensor. Accordingly, the UE 104, the RX processor 356, and/or the controller/processor 359 executing the beam control component 140 and/or the sensor state component 142 may provide means for detecting, during operation of the mobile device, a sensor state caused by a hand of an operator on the mobile device.

At block 1130, the method 1100 may communicating, while the mobile device is operating in the sensor state, using a refined beam set selected based on reference signals, the refined beam set corresponding to the sensor state. In an aspect, for example, the UE 104, the RX processor 356 and/or the controller/processor 359 may execute the beam control component 140 and/or the beam refining component 144 to communicate (e.g., communication 820), while the mobile device 504 is operating in the sensor state 714, using a refined beam set selected based on reference signals 810 (e.g., during beam training 720), the refined beam set corresponding to the sensor state. For example, the beam refining component 144 may select, while the mobile device 504 is operating in the sensor state 714, a refined beam set corresponding to the sensor state based on reference signals 810. Accordingly, the UE 104, the RX processor 356, and/or the controller/processor 359 executing the beam control component 140 and/or the beam refining component 144 may provide means for communicating, while the mobile device is operating in the sensor state, using a refined beam set selected based on reference signals, the refined beam set corresponding to the sensor state.

At block 1140, the method 1100 may include training a machine learning model based on a set of training data including pairs of the sensor state and the refined beam set to select a first set of beam weights from a second set of beam weights based on a detected sensor state. In an aspect, for example, the UE 104, the RX processor 356 and/or the controller/processor 359 may execute the beam control component 140 and/or the training component 146 to train the machine learning model 750 based on a set of training data including pairs of the sensor state and the refined beam set to select a first set of beam weights 762 from a second set of beam weights 756 based on a detected sensor state. In some implementations, the machine learning model 750 (and/or training data) is specific to the mobile device. In some implementations, the machine learning model 750 (and/or training data) is specific to the mobile device and the operator. In some implementations, the set of training data further includes an application executed by the mobile device 504 while in the sensor state. In some implementations, training the machine learning model 750 may include exporting the set of training data to an external device such as the base station or a machine learning network node. Accordingly, the UE 104, the RX processor 356, and/or the controller/processor 359 executing the beam control component 140 and/or the training component 146 may provide means for training a machine learning model based on a set of training data including pairs of the sensor state and the refined beam set to select a first set of beam weights from a second set of beam weights based on a detected sensor state.

At block 1150, the method 1100 may include communicating, during operation of the mobile device, using the first set of beam weights based on a hand blockage state including the first set of beam weights for a current detected sensor state selected based on the machine learning model. In an aspect, for example, the UE 104, the RX processor 356 and/or the controller/processor 359 may execute the beam control component 140 and/or the beam selection component 148 to communicate (e.g., communication 850), during operation of the mobile device 504, using the first set of beam weights based on a hand blockage state 760 including the first set of beam weights 762 for a current detected sensor state 754 selected based on the machine learning model (e.g., device-specific model 750). For example, the beam selection component 148 may select, during operation of the mobile device, a hand blockage state 760 including the first set of beam weights 762 for a current detected sensor state based on the machine learning model 750. For example, at sub-block 1152, the block 1150 may include classifying, by the machine learning model, sensor data into the current sensor state. At sub-block 1154, the block 1150 may include retrieving the first set of beam weights for the current detected sensor state from a stored data structure including the second set of beam weights. In some implementations, the hand blockage state corresponds to one or more of a hand grip, orientation of the hand with respect to an antenna module, number of fingers covering the antenna module, or properties of the hand. In some implementations, the first set of beam weights 762 includes phase shifter or amplitude control combinations that undo randomizations induced by the hand of the operator in the detected sensor state. In some implementations, where the base station or a network machine learning node trains the machine learning model, the UE 104 may transmit an indication of the current detected sensor state and receive an indication of the hand blockage state including the first set of beam weights based on the machine learning model. Accordingly, the UE 104, the RX processor 356, and/or the controller/processor 359 executing the beam control component 140 and/or the beam selection component 148 may provide means for communicating, during operation of the mobile device, using the first set of beam weights based on a hand blockage state including the first set of beam weights for a current detected sensor state selected based on the machine learning model.

At block 1160, the method 1100 may optionally include refining the first set of beam weights for the current detected sensor state. In an aspect, for example, the UE 104, the RX processor 356 and/or the controller/processor 359 may execute the beam control component 140 and/or the beam refining component 144 to refine the first set of beam weights 762 for the current detected sensor state. For example, at sub-block 1162, the block 1160 may include requesting a number and type of CSI-RS 866 or SRS 868 based on the current detected sensor state. As another example, at sub-block 1164, the block 1160 may include requesting a set of beams for hierarchical beam refinement. In yet another example, at sub-block 1166, the block 1160 may include performing hierarchical beam refinement based on known symbols transmitted by a base station. Accordingly, the UE 104, the RX processor 356, and/or the controller/processor 359 executing the beam control component 140 and/or the beam refining component 144 may provide means for refining the first set of beam weights for the current detected sensor state.

Figure 12:
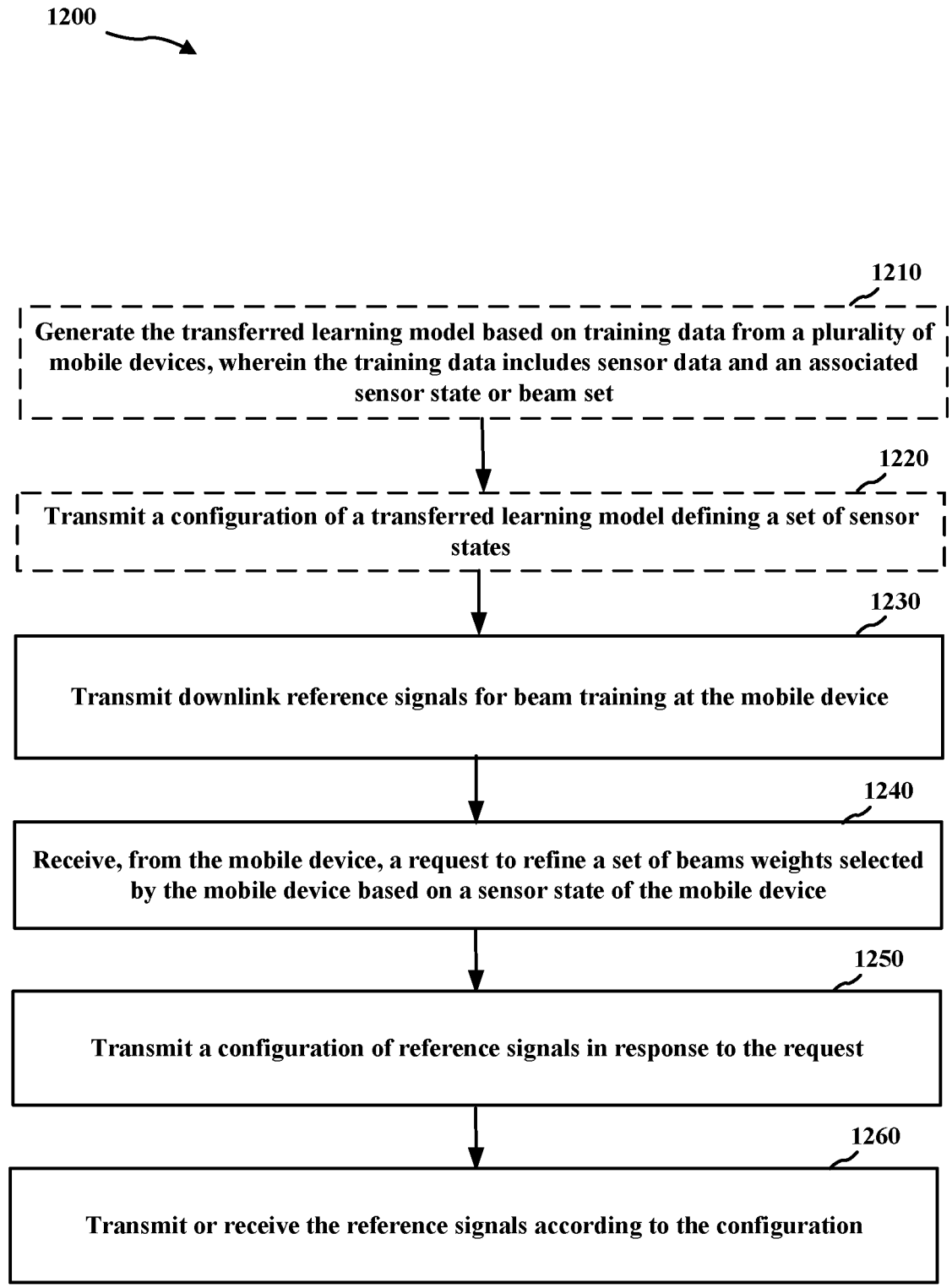
FIG. 12 is a flowchart of an example method for assisting beam training at a mobile device.

FIG. 12 is a flowchart of an example method 1200 for assisting beam training at a mobile device. The method 1200 may be performed by a base station (such as the base station 102, which may include the memory 376 and which may be the entire base station 102 or a component of the base station 102 such as the beam assist component 120, TX processor 316, the RX processor 370, or the controller/processor 375). The method 1200 may be performed by the beam assist component 120 in communication with the beam control component 140 of the UE 104. Optional blocks are shown with dashed lines.

At block 1210, the method 1200 may optionally include generating the transferred learning model based on training data from a plurality of mobile devices. In an aspect, for example, the base station 102, the controller/processor 375, and/or the TX processor 316 may execute the beam assist component 120 and/or the modeling component 910 to generate the transferred learning model 712 based on training data from a plurality of mobile devices 504. Training data may include sensor data and an associated sensor state or beam set. The sensor data may include data from one or more of: a gyroscope, a camera, an image sensor, an infra-red sensor, or a capacitive sensor. The sensor state may correspond to one or more of a hand grip, an orientation of the hand with respect to an antenna module, a number of fingers covering the antenna module, or properties of the hand or skin including permissivity, permittivity, etc. Accordingly, the base station 102, the controller/processor 375, and/or the TX processor 316 executing the beam assist component 120 and/or the modeling component 910 provide means for generating the transferred learning model based on training data from a plurality of mobile devices.

At block 1220, the method 1200 may optionally include transmitting a configuration of the transferred learning model defining a set of sensor states to a mobile device. In an aspect, for example, the base station 102, the controller/processor 375, and/or the TX processor 316 may execute the beam assist component 120 and/or the modeling component 910 to transmit the configuration of a transferred learning model 712 defining the set of sensor states 714 to the mobile device 504. The transferred learning model may be specific for a model of the mobile device. Accordingly, the base station 102, the controller/processor 375, and/or the TX processor 316 executing the beam assist component 120 and/or the modeling component 910 may provide means for transmitting a configuration of a transferred learning model defining a set of sensor states.

At block 1230, the method 1200 may include transmitting downlink reference signals for beam training at the mobile device. In an aspect, for example, the base station 102, the controller/processor 375, and/or the TX processor 316 may execute the beam assist component 120 and/or the RS component 122 to transmit downlink reference signals 810 for beam training at the mobile device 504. Accordingly, the base station 102, the controller/processor 375, and/or the TX processor 316 executing the beam assist component 120 and/or the RS component 122 may provide means for transmitting downlink reference signals for beam training at the mobile device.

At block 1240, the method 1200 may include receiving, from the mobile device, a request to refine a set of beams weights selected by the mobile device based on a sensor state of the mobile device. In an aspect, for example, the base station 102, the controller/processor 375, and/or the TX processor 316 may execute the beam assist component 120 and/or the request component 124 to receive, from the mobile device 504, a request to refine a set of beams weights 762 selected by the mobile device based on a sensor state of the mobile device. For example, the request to refine the set of beams weights may include a number and type of CSI-RS or SRS. As another example, the request to refine the set of beam weights may include a request to transmit downlink reference signals on a set of beam weights for hierarchical beam refinement. As yet another example, the request to refine the set of beam weights includes a request to transmit known symbols for performing hierarchical beam refinement. Accordingly, the base station 102, the controller/processor 375, and/or the TX processor 316 executing the beam assist component 120 and/or the request component 124 may provide means for receiving, from the mobile device, a request to refine a set of beams weights selected by the mobile device based on a sensor state of the mobile device.

At block 1250, the method 1200 may include transmitting a configuration of reference signals in response to the request. In an aspect, for example, the base station 102, the controller/processor 375, and/or the TX processor 316 may execute the beam assist component 120 and/or the configuration component 126 to transmit a configuration of reference signals in response to the request. Accordingly, the base station 102, the controller/processor 375, and/or the TX processor 316 executing the beam assist component 120 and/or the RS component 122 may provide means for transmitting a configuration of reference signals in response to the request.

At block 1260, the method 1200 may include transmitting or receiving the reference signals according to the configuration. In an aspect, for example, the base station 102, the controller/processor 375, and/or the TX processor 316 may execute the beam assist component 120 and/or the RS component 122 to transmit or receive the reference signals (e.g., CSI-RS 866 or SRS 868) according to the configuration. Accordingly, the base station 102, the controller/processor 375, and/or the TX processor 316 executing the beam assist component 120 and/or the RS component 122 may provide means for transmitting or receiving the reference signals according to the configuration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

SOME FURTHER EXAMPLE CLAUSES

Implementation examples are described in the following numbered clauses:

1. A method of beam selection for wireless communication by a mobile device, comprising:
   detecting, during operation of the mobile device, a sensor state caused by a hand of an operator of the mobile device;
   communicating, while the mobile device is operating in the sensor state, using a refined beam set selected based on reference signals, the refined beam set corresponding to the sensor state;
   training a machine learning model based on a set of training data including pairs of the sensor state and the refined beam set to select a first set of beam weights from a second set of beam weights based on a detected sensor state; and
   communicating, during operation of the mobile device, using the first set of beam weights based on a hand blockage state including the first set of beam weights for a current detected sensor state selected based on the machine learning model.

2. The method of clause 1, wherein the machine learning model is specific to the mobile device.

3. The method of clause 2, wherein the machine learning model is specific to the mobile device and the operator.

4. The method of any of clauses 1-3, wherein selecting, during operation of the mobile device, the hand blockage state including the first set of beam weights for the current detected sensor state based on the machine learning model comprises:
   classifying, by the machine learning model, sensor data into the current sensor state; and
   retrieving the first set of beam weights for the current detected sensor state from a stored data structure including the second set of beam weights.

5. The method of any of clauses 1-4, wherein the set of training data further includes an application executed by the mobile device while in the sensor state.

6. The method of any of clauses 1-5, wherein the sensor data includes data from one or more of: a gyroscope, an image sensor, an infra-red sensor, a capacitive sensor, a radar sensor, or a LIDAR sensor.

7. The method of any of clauses 1-6, further comprising refining the first set of beam weights for the current detected sensor state.

8. The method of clause 7, wherein refining the first set of beam weights for the current detected sensor state comprises requesting a number and type of channel state information reference signals (CSI-RS) or sounding reference signals (SRS) based on the current detected sensor state.

9. The method of clause 7, wherein refining the first set of beam weights for the current detected sensor state comprises requesting a set of beam weights for hierarchical beam refinement.

10. The method of clause 7, wherein refining the first set of beam weights for the current detected sensor state comprises performing hierarchical beam refinement based on known symbols transmitted by a base station.

11. The method of any of clauses 1-10, wherein the hand blockage state corresponds to one or more of a hand grip, orientation of the hand with respect to an antenna module, number of fingers covering the antenna module, or properties of the hand or a skin thereof.

12. The method of any of clauses 1-11, wherein the first set of beam weights includes phase shifter or amplitude control combinations that undo randomizations induced by the hand or a body of the operator in the detected sensor state.

13. The method of any of clauses 1-12, further comprising receiving a transferred learning model defining a set of sensor states.

14. The method of clause 13, wherein the transferred learning model is specific for a model of the mobile device.

15. An apparatus for wireless communication, comprising:
   a transceiver;
   a memory storing computer-executable instructions; and
   a processor coupled with the transceiver and the memory and configured to execute the computer-executable instructions to perform the method of any of clauses 1-14.

16. An apparatus for wireless communication, comprising:
   means for performing the method of any of clauses 1-14.

17. A non-transitory computer-readable medium storing computer executable code, the code when executed by a processor causes the processor to perform the method of any of clauses 1-14.

18. A method of assisting beam training at a mobile device, comprising:
   transmitting downlink reference signals for beam training at the mobile device;
   receiving, from the mobile device, a request to refine a set of beams weights selected by the mobile device based on a sensor state of the mobile device;
   transmitting a configuration of reference signals in response to the request; and
   transmitting or receiving the reference signals according to the configuration.

19. The method of clause 18, wherein the request to refine the set of beams weights includes a number and type of channel state information reference signals (CSI-RS) or sounding reference signals (SRS).

20. The method of clause 18, wherein the request to refine the set of beams weights includes a request to transmit downlink reference signals on a set of beams for hierarchical beam refinement.

21. The method of clause 18, wherein the request to refine the set of beams weights includes a request to transmit known symbols for performing hierarchical beam refinement.

22. The method of any of clauses 18-21, further comprising transmitting a configuration of a transferred learning model defining a set of sensor states to the mobile device.

23. The method of clause 22, wherein the transferred learning model is specific for a model of the mobile device.

24. The method of clause 22 or 23, further comprising generating the transferred learning model based on training data from a plurality of mobile devices, wherein the training data includes sensor data and an associated sensor state or beam set.

25. The method of clause 24, wherein the sensor state corresponds to one or more of a hand grip, an orientation of the hand with respect to an antenna module, a number of fingers covering the antenna module, or properties of the hand.

26. The method of clause 24 or 25, wherein the sensor data includes data from one or more of: a gyroscope, an image sensor, an infra-red sensor, a capacitive sensor, or a radar sensor.

27. An apparatus for wireless communication, comprising:
- a transceiver;
- a memory storing computer-executable instructions; and
- a processor coupled with the transceiver and the memory and configured to execute the computer-executable instructions to perform the method of any of clauses 15-26.

28. An apparatus for wireless communication, comprising:
- means for performing the method of any of clauses 15-26.

29. A non-transitory computer-readable medium storing computer executable code, the code when executed by a processor causes the processor to perform the method of any of clauses 15-26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of beam selection for wireless communication by a mobile device, comprising:
- detecting, during operation of the mobile device, a sensor state caused by a hand of an operator of the mobile device, wherein the sensor state corresponds to a hand blockage state that is specific to a hand blockage scenario;
- communicating, while the mobile device is operating in the sensor state, using a refined beam set selected based on reference signals, the refined beam set corresponding to the sensor state;
- training a machine learning model based on a set of training data including sets of the sensor state, the hand blockage state, and the refined beam set for the hand blockage state to select a first set of beam weights for a hand blockage state from a second set of beam weights based on a detected sensor state; and
- communicating, during operation of the mobile device, using the first set of beam weights based on a current hand blockage state including the first set of beam weights, wherein the current hand blockage state is selected by the machine learning model based on r a current detected sensor state.

2. The method of claim 1, wherein the machine learning model is specific to the mobile device.

3. The method of claim 2, wherein the machine learning model is specific to the mobile device and the operator.

4. The method of claim 1, wherein selecting, during operation of the mobile device, the current hand blockage state including the first set of beam weights for the current detected sensor state comprises:
- classifying, by the machine learning model, sensor data into the current hand blockage state; and
- retrieving the first set of beam weights for the current hand blockage state from a stored data structure including the second set of beam weights.

5. The method of claim 1, wherein the set of training data further includes an application executed by the mobile device while in the sensor state.

6. The method of claim 1, wherein the sensor data includes data from one or more of: a gyroscope, an image sensor, an infra-red sensor, a capacitive sensor, a radar sensor, or a LIDAR sensor.

7. The method of claim 1, further comprising refining the first set of beam weights for the current detected sensor state.

8. The method of claim 7, wherein refining the first set of beam weights for the current detected sensor state comprises requesting a number and type of channel state information reference signals (CSI-RS) or sounding reference signals (SRS) based on the current detected sensor state.

9. The method of claim 7, wherein refining the first set of beam weights for the current detected sensor state comprises requesting a set of beam weights for hierarchical beam refinement.

10. The method of claim 7, wherein refining the first set of beam weights for the current detected sensor state comprises performing hierarchical beam refinement based on known symbols transmitted by a base station.

11. The method of claim 1, wherein the hand blockage state corresponds to one or more of a hand grip, orientation of the hand with respect to an antenna module, number of fingers covering the antenna module, or properties of the hand or a skin thereof.

12. The method of claim 1, wherein the first set of beam weights includes phase shifter or amplitude control combinations that undo randomizations induced by the hand or a body of the operator in the detected sensor state.

13. The method of claim 1, further comprising receiving a transferred learning model defining a set of sensor states.

14. The method of claim 13, wherein the transferred learning model is specific for a model of the mobile device.

15. An apparatus for beam selection for wireless communication by a mobile device, comprising:
- a memory storing computer-executable instructions; and at least one processor communicatively coupled with the memory and configured to execute the instructions to:
- detect, during operation of the mobile device, a sensor state caused by a hand of an operator on the mobile device, wherein the sensor state corresponds to a hand blockage state that is specific to a hand blockage scenario;
- communicate, while the mobile device is operating in the sensor state, using a refined beam set selected based on reference signals, the refined beam set corresponding to the sensor state;
- train a machine learning model based on a set of training data including sets of the sensor state, the hand blockage state, and the refined beam set for the hand blockage state to select a first set of beam weights for a hand blockage state from a second set of beam weights based on a detected sensor state; and
- communicate, during operation of the mobile device, using the first set of beam weights based on a current hand blockage state including the first set of beam weights, wherein the current hand blockage state is selected by the machine learning model based on a current detected sensor state.

16. The apparatus of claim 15, wherein the machine learning model is specific to the mobile device.

17. The apparatus of claim 16, wherein the machine learning model is specific to the mobile device and the operator.

18. The apparatus of claim 15, wherein the at least one processor is configured to:
- classify, using the machine learning model, sensor data into the current hand blockage state; and
- retrieve a set of beam weights for the current hand blockage state from a stored data structure including the second set of beam weights.

19. The apparatus of claim 15, wherein the set of training data further includes an application executed by the mobile device while in the sensor state.

20. The apparatus of claim 15, further comprising one or more of: a gyroscope, an image sensor, an infra-red sensor, a capacitive sensor, a radar sensor, or a LIDAR sensor.

21. The apparatus of claim 15, wherein the at least one processor is configured to reline the first set of beam weights for the current detected sensor state.

22. The apparatus of claim 21, wherein to refine the first set of beam weights for the current detected sensor state, the at least one processor is configured to request a number and type of channel state information reference signals (CSI-RS) or sounding reference signals (SRS) based on the current detected sensor state.

23. The apparatus of claim 21, wherein to reline the first set of beam weights for the current detected sensor state, the at least one processor is configured to request a set of beams for hierarchical beam refinement.

24. The apparatus of claim 21, wherein to refine the first set of beam weights for the current detected sensor state, the at least one processor is configured to perform hierarchical beam refinement based on known symbols transmitted by a base station.

25. The apparatus of claim 15, wherein the hand blockage state corresponds to one or more of a hand grip, orientation of the hand with respect to an antenna module, number of fingers covering the antenna module, or properties of the hand or a skin thereof.

26. The apparatus of claim 15, wherein the first set of beam weights includes phase shifter or amplitude control combinations that undo randomizations induced by the hand or a body of the operator in the detected sensor state.

27. The apparatus of claim 15, wherein the at least one processor is configured to receive a transferred learning model defining a set of sensor states.

28. The apparatus of claim 27, wherein the transferred learning model is specific for a model of the mobile device.

29. An apparatus for beam selection for wireless communication by a mobile device, comprising:
- means for detecting, during operation of the mobile device, a sensor state caused by a hand of an operator on the mobile device, wherein the sensor state comprises a hand blockage state that is specific to a hand blockage scenario;
- means for communicating, while the mobile device is operating in the sensor state, using a refined beam set selected based on reference signals, the refined beam set corresponding to the sensor state;
- means for training a machine learning model based on a set of training data including set of the sensor state, the hand blockage state, the hand blockage state, and the refined beam set for the hand blockage state to select a first set of beam weights for a hand blockage state from a second set of beam weights based on a detected sensor state; and
- means for communicating, during operation of the mobile device, using the first set of beam weights based on a current hand blockage state including the first set of beam weights, wherein the current hand blockage state is selected by the machine learning model based on a current detected sensor state.

30. A non-transitory computer-readable medium storing computer-executable instructions that when executed by a processor of a mobile device cause the mobile device to:
- detect, during operation of the mobile device, a sensor state caused by a hand of an operator on the mobile device, wherein the sensor state comprises a hand blockage state that is specific to a hand blockage scenario;
- communicate, while the mobile device is operating in the sensor state, using a refined beam set selected based on reference signals, the refined beam set corresponding to the sensor state;
- train a machine learning model based on a set of training data including sets of the sensor state, the hand blockage state, and the refined beam set for the hand blockage state to select a first set of beam weights for a hand blockage state from a second set of beam weights based on a detected sensor state; and
- communicate, during operation of the mobile device, using the first set of beam weights based on a current hand blockage state including the first set of beam weights, wherein the current hand blockage state is selected by the machine learning model based on a current detected sensor state.

* * * * *